United States Patent
Seko et al.

(10) Patent No.: US 6,843,288 B2
(45) Date of Patent: Jan. 18, 2005

(54) TIRE/WHEEL ASSEMBLY AND RUN-FLAT SUPPORT MEMBER

(75) Inventors: Akikazu Seko, Hiratsuka (JP); Takuzo Sano, Hiratsuka (JP); Koichi Iwasaki, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 22 days.

(21) Appl. No.: 10/618,609

(22) Filed: Jul. 15, 2003

(65) Prior Publication Data

US 2004/0016489 A1 Jan. 29, 2004

(30) Foreign Application Priority Data

Jul. 26, 2002 (JP) ...................................... 2002-217534

(51) Int. Cl.⁷ .............................................. B60C 17/06
(52) U.S. Cl. ...................... 152/156; 152/158; 152/520
(58) Field of Search ................................. 152/156, 158, 152/520, 248, 249

(56) References Cited

FOREIGN PATENT DOCUMENTS

| DE | 101 61 365 A1 * | 6/2003 |
|---|---|---|
| EP | 0 980 771 A2 * | 2/2000 |
| JP | 10-297226 A1 | 11/1998 |
| JP | 2001-163020 A1 | 6/2001 |
| JP | 2001-519279 A1 | 10/2001 |

* cited by examiner

*Primary Examiner*—Adrienne C. Johnstone
(74) *Attorney, Agent, or Firm*—Rader, Fishman & Grauer PLLC

(57) ABSTRACT

The present invention provides a tire/wheel assembly and a run-flat support member. The tire/wheel assembly is formed as follows: a pneumatic tire is fitted to a wheel rim; and the run-flat support member constituted of a circular shell and elastic rings is inserted into a cavity of the pneumatic tire, in which the circular shell has a support surface thereof extended toward the periphery of the tire and leg portions along each side of the support surface, and the elastic rings support the leg portions of the circular shell on the wheel rim. In the tire/wheel assembly, a plurality of through-holes or wavy asperities are made in the inner rim of each of the leg portions of the circular shell along a shell circumferential direction. The inner rims in which these through-holes or asperities are formed are embedded in the elastic rings.

12 Claims, 2 Drawing Sheets

TIRE/WHEEL ASSEMBLY AND RUN-FLAT SUPPORT MEMBER

BACKGROUND OF THE INVENTION

The present invention relates to a tire/wheel assembly which enables run-flat traveling and to a run-flat support member which is employed in the tire/wheel assembly. More specifically, the present invention relates to a tire/wheel assembly and a run-flat support member in which durability is improved for run-flat traveling.

To meet the demand from the market, numerous techniques have been proposed to enable a certain degree of emergency driving even when a pneumatic tire is punctured while driving a vehicle. Among those numerous proposals, the techniques proposed in Japanese Patent Laid-Open Publication No. 10-297226 and Published Japanese Translation of a PCT Application No. 2001-519279 enable run-flat traveling by fitting a core to a rim in a cavity of a pneumatic tire assembled to the rim and supporting a flat tire with the core.

The foregoing run-flat core has an open-leg-structured circular shell including a support surface thereof extended toward the periphery of the tire and leg portions along each side of the support surface. The run-flat core is constituted by attaching elastic rings to both of these leg portions so that the core is supported on the rim through the elastic rings. The advantage of the run-flat core is that the available rims and wheels in the market can be used as their own, without any particular modifications. Thus, the core can be accepted to the market without causing difficulties therein.

Nevertheless, in a tire/wheel assembly including the preceding core, large stresses act on bonding portions between the elastic rings and the leg portions of the circular shell during run-flat traveling. Accordingly, there has been a problem that durability required for run-flat traveling cannot be satisfied when adhesion is insufficient between the elastic rings and leg portions of the circular shell. To counteract the problem, for example, it is considered that surfaces of the leg portions of the circular shell, which are bonded with the elastic rings, are made rough. However, these rough surfaces could not sufficiently improve the adhesion between the two.

SUMMARY OF THE INVENTION

An object of the present invention is to provide a tire/wheel assembly and a run-flat support member in which an improvement in durability is enabled for run-flat traveling.

The tire/wheel assembly of the present invention for achieving the foregoing object is constituted as follows: a pneumatic tire is fitted to a wheel rim; and the run-flat support member constituted of a circular shell and elastic rings is inserted into a cavity of the pneumatic tire, in which the circular shell has a support surface thereof extended toward the periphery of the tire and leg portions along each side of the support surface, and the elastic rings support the leg portions of the circular shell on the rim. The tire/wheel assembly is characterized by that a plurality of through-holes are made in the inner rim of each leg portion of the circular shell along a shell circumferential direction and that the inner rims in which these through-holes are formed are embedded in the elastic rings.

Moreover, the tire/wheel assembly of the present invention for achieving the object is constituted as follows: a pneumatic tire is fitted to a wheel rim; and the run-flat support member constituted of a circular shell and elastic rings is inserted into a cavity of the pneumatic tire, in which the circular shell has a support surface thereof extended toward the periphery of the tire and leg portions along each side of the support surface, and the elastic rings support the leg portions of the circular shell on the rim. The tire/wheel assembly is characterized by that wavy asperities are made in the inner rim of each leg portion of the circular shell along a shell circumferential direction and that the inner rims in which these asperities are formed are embedded in the elastic rings.

Meanwhile, the run-flat support member of the present invention is constituted of a circular shell and elastic rings, in which the circular shell has a support surface thereof extended toward the periphery of the tire and leg portions along each side of the support surface, and the elastic rings support the leg portions of the circular shell on a wheel rim. The run-flat support member is characterized by that a plurality of through-holes are made in the inner rim of each leg portion of the circular shell along a shell circumferential direction and that the inner rims in which these through-holes are formed are embedded in the elastic rings.

Furthermore, the run-flat support member of the present invention is constituted of a circular shell and elastic rings, in which the circular shell has a support surface thereof extended toward the periphery of the tire and leg portions along each end of the support surface, and the elastic rings support the leg portions of the circular shell on a wheel rim. The run-flat support member is characterized by that wavy asperities are made in the inner rim of each leg portion of the circular shell along a shell circumferential direction and that the inner rim in which these asperities are formed are embedded in the elastic rings.

In the present invention, the outer diameter of the run-flat support member is formed to be smaller than the inner diameter of a tread of the pneumatic tire so that a constant distance is maintained between the run-flat support member and the pneumatic tire. The inner diameter of the run-flat support member is formed to have substantially the same size as that of the inner diameter of a bead of the pneumatic tire. The run-flat support member as well as the pneumatic tire are fit to the wheel rim while the run-flat support member is inserted into the cavity of the pneumatic tire thereby constituting the tire/wheel assembly. When the pneumatic tire is punctured while driving a vehicle to which the tire/wheel assembly is attached, the support surface of the circular shell of the run-flat support member supports the punctured deflated tire. Therefore, the run-flat traveling is enabled.

According to the present invention, a plurality of through-holes or wavy asperities are made in the inner rim of each leg portion of the circular shell along a shell circumferential direction, and the inner rims in which these through-holes or asperities are formed are embedded in the elastic rings. Accordingly, a bonding area is enlarged between the elastic rings and the leg portions of the circular shell. Thus, adhesion between the two is enhanced, and durability is improved for run-flat traveling.

In the present invention, a plurality of through-holes and wavy asperities can be simultaneously made in the inner rim of each leg portion of the circular shell along a shell circumferential direction. The number of the through-holes formed in the inner rim of each leg portion of the circular shell is preferably 16 to 360. An area of each through-hole is preferably 0.75 to 20 mm$^2$. Moreover, amplitudes and pitches of the asperities are preferably 0.5 to 2.0 mm and 1 to 20 mm, respectively. Hence, adhesion can be improved between the elastic rings and the leg portions of the circular shell without excessive degradation of the strength of the circular shell.

DETAILED DESCRIPTION OF THE PREFERRED EMBODIMENTS

The present invention is detailed below with reference to the attached drawings.

Figure 1:
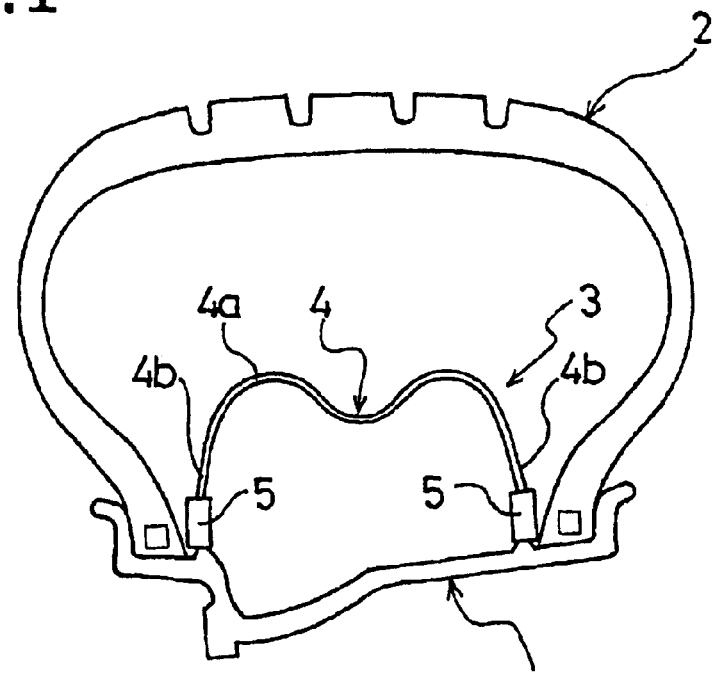
FIG. 1 is a meridian sectional view showing an essential part of a tire/wheel assembly formed in an embodiment of the present invention.

FIG. 1 is a meridian sectional view showing an essential part of a tire/wheel assembly (a wheel) formed in an embodiment of the present invention. Reference numerals 1, 2 and 3 denote a wheel rim, a pneumatic tire and a run-flat support member, respectively. These rim 1, pneumatic tire 2 and run-flat support member 3 are formed in a circle around a wheel rotation axis (not shown).

A circular shell 4 and elastic rings 5 constitute an essential part of the run-flat support member 3. This run-flat support member 3 is spaced from the inner wall of the pneumatic tire 2 under normal driving conditions. When the pneumatic tire 2 is punctured, the run-flat support member 3 supports the flattened pneumatic tire 2 from the inside.

The circular shell 4 has an open leg structure in which a continuous support surface 4a for sustaining the flat tire is extended toward the periphery of the tire (outer radial direction), and leg portions 4b and 4b are provided along each side of the support surface 4a. The support surface 4a of the circular shell 4 is formed so that the support surface 4a has a convexly curved portion toward the periphery of the tire in a cross section orthogonal to the circumferential direction. A minimum of one convexly curved portion is required, but two or more convexly curved portions are preferably aligned in a tire axial direction. In this way, the support surface 4a of the circular shell 4 is formed so that two or more convexly curved portions are aligned. Accordingly, two or more portions in contact with the inner wall of the tire can be distributed on the support surface 4a, and local wear on the inner wall of the tire can be reduced. Therefore, it is possible to extend a distance which a vehicle endures run-flat traveling.

The foregoing circular shell 4 is made of a rigid material in order to sustain the vehicle weight through the flat pneumatic tire 2, and metal, resin or the like are used for the constituent material. As for the metal, steel and aluminum are exemplified. As for the resin, both thermoplastic resin and thermosetting resin can be used. Examples of thermoplastic resin are nylon, polyester, polyethylene, polypropylene, polystyrene, polyphenylene sulfide and ABS. Examples of thermosetting resin are epoxy resin and unsaturated polyester resin. Resin can be used as single or fiber reinforced resin by containing reinforcing fiber.

The elastic rings 5 are respectively attached to the leg portions 4b and 4b of the circular shell 4 and abutted on bilateral rim seats to support the circular shell 4. These elastic rings 5 alleviate impact and vibration of the circular shell 4 caused by the punctured pneumatic tire 2. The elastic rings 5 also prevent slipping on the rim seats to stably support the circular shell 4.

Rubber or resin can be used as a constituent material of the elastic rings 5, and rubber is more preferable. Examples of rubber types are natural rubber (NR), isoprene rubber (IR), styrene-butadiene rubber (SBR), butadiene rubber (BR), hydrogenated acrylonitrile-butadiene rubber, hydrogenated styrene-butadiene rubber, ethylene propylene rubber (EPDM, EPM), butyl rubber (IIR), acrylic rubber (ACM), chloroprene rubber (CR), silicone rubber and fluoro-rubber. As a matter of course, it is possible for these types of rubber to contain an additive such as filler, vulcanizer, vulcanization accelerator, softener and antioxidant as appropriate. Accordingly, a desired elastic modulus can be obtained based on the compounding ratio of the rubber components.

In the tire/wheel assembly thus constituted, when the pneumatic tire 2 is punctured while driving a vehicle, the support surface 4a of the circular shell 4 of the run-flat support member 3 supports the flattened pneumatic tire 2. Thus, run-flat traveling is enabled.

Figure 2:
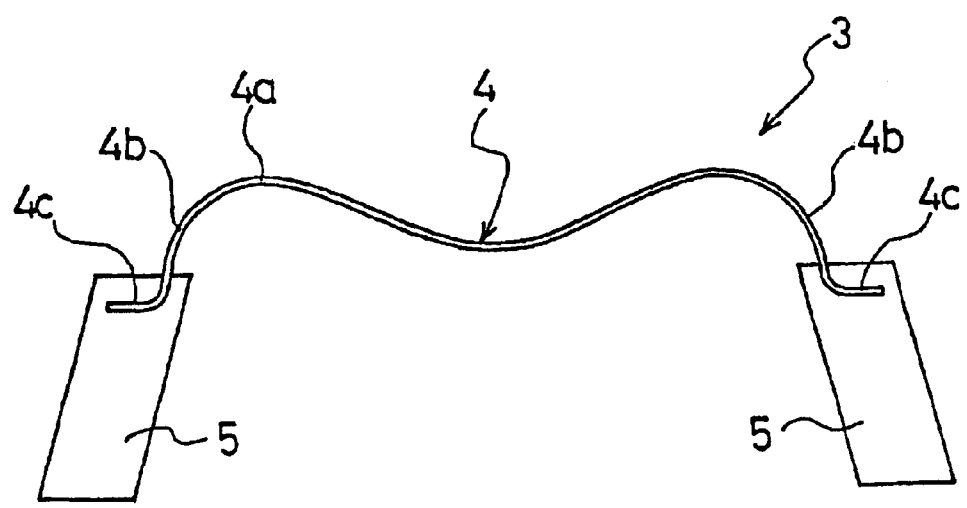
FIG. 2 is sectional view more specifically showing a run-flat support member of the present invention.

FIG. 2 shows the run-flat supporting member more specifically. As shown in FIG. 2, the inner rims 4c of the leg portions 4b of the circular shell 4 are bent to curve toward a shell axial direction. The bent inner rims 4c are embedded in the elastic rings 5. Thus, a load applied on the circular shell 4 is transmitted to the entirety of the elastic rings 5 through the inner rims 4c extended in the shell axial direction. This bent structure is effective to avoid concentration of stresses. Note that the inner rims 4c can be extended inwardly in a shell radial direction instead of bending in the shell axial direction.

Figure 3:
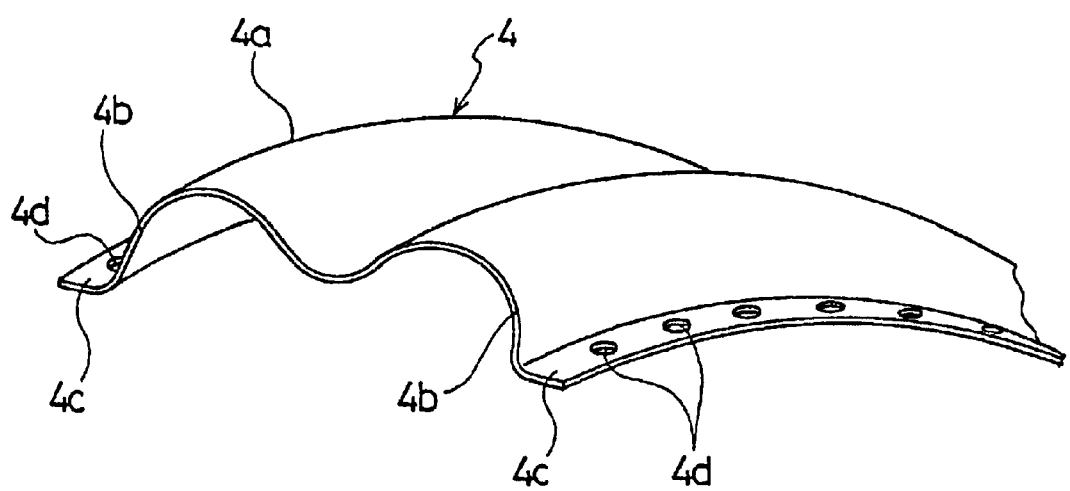
FIG. 3 is a perspective view more specifically showing a circular shell which constitutes the run-flat support member of the present invention.

FIG. 3 more specifically shows the circular shell which constitutes the run-flat support member. As shown in FIG. 3, a plurality of through-holes 4d are made in the inner rims 4c of each leg portion 4b of the circular shell 4 along a shell circumferential direction. Shapes of the through-holes 4d are not particularly limited. The shapes of the through-holes 4d can be circular, ovoid or the like. In addition, it is possible to combine and dispose differently shaped and sized through-holes 4d. Once the inner rims 4c in which these through-holes 4d are formed are embedded in the elastic rings 5, even the through-holes 4d are filled with the constituent material of the elastic rings 5. Accordingly, a bonding area between the elastic rings 5 and the leg portions 4b of the circular shell 4 is enlarged. As a result, the adhesion is increased between the elastic rings 5 and the leg portions 4b of the circular shell 4, and the durability is enhanced for run-flat traveling. Furthermore, the provision of the through-holes 4d has an effect of lightening the circular shell 4.

Herein, the number of the through-holes 4d formed in the inner rims 4c of each leg portion 4b of the circular shell 4 is preferably 16 to 360, and an area of each through-hole 4d is preferably 0.75 to 20 mm². As a matter of course, it is preferred to dispose the through-holes 4d at a regular interval in a shell circumferential direction. If the number of the through-holes 4d is less than 16, effects of improvement in the adhesion become insufficient. On the other hand, if the number of the through-holes 4d exceeds 360, it is difficult to make holes. Moreover, if the area of each through-hole 4d is less than 0.75 mm², it is hard to fill the through-holes 4d with the constituent material of the elastic rings 5. On the contrary, if the area exceeds 20 mm², the strength of the circular shell 4 degrades.

Figure 4:
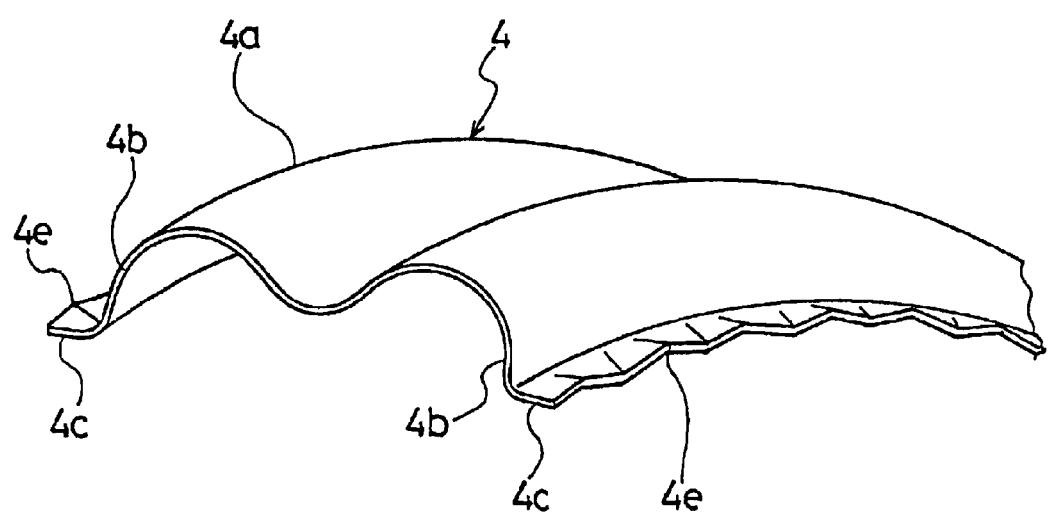
FIG. 4 is a perspective view showing a modification example of a circular shell which constitutes the run-flat support member of the present invention.

FIG. 4 shows a modification example of the circular shell which constitutes the aforementioned run-flat support member. As show in FIG. 4, wavy asperities 4e are made in the inner rim 4c of each leg portion 4b of the circular shell 4 along the shell circumferential direction. Shapes of the asperities 4e are not particularly limited, but can be curved, zigzagged, or the like. Once the inner rims 4c in which these asperities 4e are formed are embedded in the elastic rings 5, a bonding area between the elastic rings 5 and the leg portions 4b of the circular shell 4 is enlarged. As a result, adhesion is enhanced between the elastic rings 5 and the leg portions 4b of the circular shell 4, and the durability is improved for run-flat traveling.

Herein, amplitudes of the asperities 4e which are formed in the inner rim 4c of each leg portion 4b of the circular shell 4 are preferably 0.5 to 2.0 mm, and pitches thereof are preferably 1 to 20 mm. If the amplitudes of the asperities 4e are less than 0.5 mm, effects of improvement in adhesion become insufficient. On the other hand, if the amplitudes of the asperities 4e exceed 2.0 mm, the strength of the circular shell 4 degrades. In addition, if the pitches of the asperities 4e are less than 1 mm, the strength of the circular shell 4 degrades. On the contrary, if the pitches of the asperities 4e exceed 20 mm, effects of improvement in adhesion become insufficient.

The embodiments in FIGS. 3 and 4 can be independently implemented independently or combined to be implemented jointly. Note that the circular shells shown in FIGS. 3 and 4 can be easily produced by punching and knurling, respectively.

EXAMPLE

A tire/wheel assembly having a pneumatic tire with a tire size of 205/55R16 89V and a wheel with a rim size of 16×6 ½JJ was prepared. In this tire/wheel assembly, a 1.0 mm-thick steel plate was processed to create a circular shell. As shown in FIG. 3, a plurality of through-holes were made in the inner rim of each leg portion of the circular shell along a shell circumferential direction. Then, a run-flat support member was created, in which the inner rims where these through-holes were made were embedded in elastic rings made of hard rubber. This run-flat support member was inserted into a cavity of the pneumatic tire. Thus, the tire/wheel assembly (Example 1) was created.

As shown in FIG. 4, instead of the through-holes, wavy asperities were made in the inner rim of each leg portion of the circular shell along the shell circumferential direction. Thereafter, a run-flat support member was created in which the inner rims having these asperities were embedded in elastic rings made of hard rubber. Other than the employment of this type of run-flat support member, the tire/wheel assembly (Example 2) having the same structure as that of Example 1 was obtained.

Furthermore, for comparison, a run-flat support member was created, where no processing was performed in the inner rim of each leg portion of the circular shell. The tire/wheel assembly (conventional example) having the same structure as that of Example 1 other than employment of the above run-flat support member was thus obtained.

Durability of the above-mentioned three types of the tire/wheel assemblies during run-flat traveling was evaluated by the following measurement method, and the results thereof are listed in Table 1.

Durability During Run-Flat Traveling

A tire/wheel assembly to be tested was fit in the right front wheel of a front engine/rear drive car with an engine capacity of 2.5 liter. Inner pressure of the tire was set to 0 kPa (200 kPa for other tires), and the car was driven counterclockwise at 90 km/h in a circular circuit. A distance that the car was driven was measured until the car became incapable of being driven. The results of evaluation are indicated by index number, where the assembly of the conventional example is set to 100. The larger the index number is, the better the durability during run-flat traveling was.

TABLE 1

|  | Conventional Example | Example 1 | Example 2 |
| --- | --- | --- | --- |
| Presence of Through-holes | Absent | Present | Absent |
| Presence of Asperities | Absent | Absent | Present |
| Durability During Run-Flat Traveling | 100 | 108 | 105 |

As shown in Table 1, the tire/wheel assemblies of the examples 1 and 2 had better durability than that of the conventional example during run-flat traveling.

According to the present invention, a run-flat support member is constituted of a circular shell and elastic rings, in which the circular shell has a support surface thereof extended toward the periphery of the tire and leg portions along each side of the support surface, and the elastic rings support the leg portions of the circular shell on a rim. In the run-flat support member, a plurality of through-holes or wavy asperities are made in the inner rim of each leg portion of the circular shell along a shell circumferential direction. The inner rims where these through-holes or asperities are formed are embedded in the elastic rings. Accordingly, adhesion between the elastic rings and the leg portions of the circular shell can be enhanced, and the durability can be improved for run-flat traveling.

Hereinbefore, the preferred embodiments of the present invention have been detailed. It is to be understood that various modifications, variations and changes can be made without departing from the spirit and scope of the present invention defined by the appended claims.

What is claimed is:

1. A tire/wheel assembly, in which a pneumatic tire is fitted to a wheel rim, including:
   a run-flat support member constituted of a circular shell and elastic rings and inserted into a cavity of the pneumatic tire, the circular shell having a support surface thereof extended toward a periphery of the pneumatic tire and leg portions along each side of the support surface, and the elastic rings supporting the leg portions of the circular shell on the rim,
   wherein a plurality of through-holes are made in an inner rim of each of the leg portions of the circular shell along a shell circumferential direction, and the inner rims in which the through-holes are formed are embedded in the elastic rings.

2. The tire/wheel assembly according to claim 1, wherein a number of the through-holes formed in the inner rim of each of the leg portions of the circular shell is 16 to 360, and an area of each through-hole is 0.75 to 20 mm$^2$.

3. A tire/wheel assembly, in which a pneumatic tire is fitted to a wheel rim, including:
   a run-flat support member constituted of a circular shell and elastic rings and inserted into a cavity of the pneumatic tire, the circular shell having a support surface thereof extended toward a periphery of the pneumatic tire and leg portions along each side of the support surface, and the elastic rings supporting the leg portions of the circular shell on the rim, wherein wavy asperities are made in an inner rim of each of the leg portions of the circular shell along a shell circumferential direction, and the inner rims in which the asperities are formed are embedded in the elastic rings.

4. The tire/wheel assembly according to claim 3, wherein amplitudes of the asperities are 0.5 to 2.0 mm, and pitches of the asperities are 1 to 20 mm.

5. A tire/wheel assembly, in which a pneumatic tire is fitted to a wheel rim, including:

a run-flat support member constituted of a circular shell and elastic rings and inserted into a cavity of the pneumatic tire, the circular shell having a support surface thereof extended toward a periphery of the pneumatic tire and leg portions along each side of the support surface, and the elastic rings supporting the leg portions of the circular shell on the rim, wherein a plurality of through-holes and wavy asperities are made in an inner rim of each of the leg portions of the circular shell along a shell circumferential direction, and the inner rims in which the through-holes and the asperities are formed are embedded in the elastic rings.

6. The tire/wheel assembly according to claim 5, wherein a number of the through-holes formed in the inner rim of each of the leg portions of the circular shell is 16 to 360, and an area of each of the through-holes is 0.75 to 20 mm$^2$, and wherein amplitudes of the asperities are 0.5 to 2.0 mm, and pitches of the asperities are 1 to 20 mm.

7. A run-flat support member, comprising:

a circular shell which has a support surface thereof extended toward a periphery of a pneumatic tire and leg portions along each side of the support surface; and elastic rings which support the leg portions of the circular shell on a wheel rim, wherein a plurality of through-holes are made in an inner rim of each of the leg portions of the circular shell along a shell circumferential direction, and the inner rims in which the through-holes are formed are embedded in the elastic rings.

8. The run-flat support member according to claim 7, wherein a number of the through-holes formed in the inner rim of each of the leg portions of the circular shell is 16 to 360, and an area of each of the through-holes is 0.75 to 20 mm$^2$.

9. A run-flat support member, comprising:

a circular shell which has a support surface thereof extended toward a periphery of a pneumatic tire and leg portions along each side of the support surface; and elastic rings which support the leg portions of the circular shell on a wheel rim, wherein wavy asperities are made in an inner rim of each of the leg portions of the circular shell along a shell circumferential direction, and the inner rims in which the asperities are formed are embedded in the elastic rings.

10. The run-flat support member according to claim 9, wherein amplitudes of the asperities are 0.5 to 2.0 mm, and pitches of the asperities are 1 to 20 mm.

11. A run-flat support member, comprising:

a circular shell which has a support surface thereof extended toward a periphery of a pneumatic tire and leg portions along each side of the support surface; and elastic rings which support the leg portions of the circular shell on a wheel rim, wherein a plurality of through-holes and wavy asperities are made in an inner rim of each of the leg portions of the circular shell along a shell circumferential direction, and the inner rims in which the through-holes and the asperities are formed are embedded in the elastic rings.

12. The run-flat support member according to claim 11, wherein a number of the through-holes formed in the inner rim of each of the leg portions of the circular shell is 16 to 360, and an area of each of the through-holes is 0.75 to 20 mm$^2$, and wherein amplitudes of the asperities are 0.5 to 2.0 mm, and pitches of the asperities are 1 to 20 mm.

* * * * *